United States Patent [19]

Muhlberger et al.

[11] Patent Number: 4,630,027
[45] Date of Patent: Dec. 16, 1986

[54] SERVICE-INTERVAL DISPLAY FOR MOTOR VEHICLES

[75] Inventors: Heinz Muhlberger, Eching; Erwin Starmuhler, Munich; Walter Weishaupt, Munich; Peter Flohr, Munich; Fritz Bourauel, Munich, all of Fed. Rep. of Germany

[73] Assignee: Bayerische Motoren Werke A.G., Munich, Fed. Rep. of Germany

[21] Appl. No.: 346,763

[22] Filed: Feb. 8, 1982

[30] Foreign Application Priority Data

Feb. 6, 1981 [DE] Fed. Rep. of Germany ..... 31041744

[51] Int. Cl.$^4$ ............................................. B60Q 1/00
[52] U.S. Cl. ............................ 340/52 F; 340/52 R; 364/424; 364/569
[58] Field of Search ............... 340/52 R, 59, 52 D, 340/52 F; 73/113, 117.3; 364/424, 431.01, 442, 431.02, 431.03, 569, 900; 377/21; 346/618

[56] References Cited

U.S. PATENT DOCUMENTS

| 4,129,034 | 12/1978 | Niles | 364/442 |
| 4,144,521 | 3/1979 | Lehnhert | 340/59 |
| 4,159,531 | 6/1979 | McGrath | 364/900 |
| 4,244,210 | 1/1981 | Prohaska | 73/113 |
| 4,267,569 | 5/1981 | Baumann | 364/424 |
| 4,404,641 | 9/1983 | Bazarnik | 364/424 |
| 4,523,283 | 6/1985 | Muhlberger | 340/52 D |
| 4,525,782 | 6/1985 | Wohlfarth | 340/52 D |

FOREIGN PATENT DOCUMENTS 32386 11/1984 Fed. Rep. of Germany.

OTHER PUBLICATIONS

Mercedes Benz Operating Instructions, Sep. 1977.

Primary Examiner—John W. Caldwell, Sr.
Assistant Examiner—Michael F. Heim
Attorney, Agent, or Firm—Craig & Burns

[57] ABSTRACT

A service-interval display for motor vehicles, which generates a signal when a limiting parameter value is reached. Total fuel consumption serves as the basic parameter instead of the distance travelled, previously employed. Other parameters may serve to modify the generation of the signal to cause an earlier or later warning to be displayed.

14 Claims, 4 Drawing Figures

SERVICE-INTERVAL DISPLAY FOR MOTOR VEHICLES

BACKGROUND OF THE INVENTION

The invention relates to a method and apparatus for a service-interval display for engines, motor vehicles and the like, which generates a signal when a limiting parameter value is reached.

In known displays of this type, the distance travelled serves as the parameter. Consequently, the actual load on the engine, on which a majority of the servicing is performed, is insufficiently monitored. Hence, servicing is usually performed much earlier than engine load or wear require. The limiting value for the distance travelled must be set so that servicing is performed at the correct time even under extreme conditions, as for example in cold starting followed by hard acceleration. Furthermore, the criterion of the distance travelled either completely or insufficiently monitors several especially wear-intensive operating conditions, for example, warming up the vehicle at rest or accelerating hard with the engine cold.

The goal of the invention is to provide a display of the type recited hereinabove, which indicates that servicing is necessary precisely when it is in fact required.

The solution to this problem consists of using the total fuel consumption as a parameter.

It will be understood that at least one way of measuring total consumption is to determine the fuel consumed from some arbitrary point in time. Such a point in time will, of course, be different for different engines and for different operating circumstances. Thus, for a new engine, the starting point for measuring may be the instant of initial operation.

For other engines the starting point may immediately follow the carrying out of a particular maintenance operation.

This criterion permits monitoring both the above-mentioned extreme operating states and normal driving conditions, in a surprisingly simple manner, completely and with precise relationship to the actual engine wear. For example, if a given speed is assumed, fuel consumption decreases when the engine is operated more gently and increases directly with the load imposed on the engine. Hence, the load on the engine at a given moment has a direct correlation to the fuel consumption at the same instance. Consequently, total fuel consumption is a good measure of total engine wear.

It has been found that total fuel consumption can be the only parameter monitored for determining the need for servicing to compensate for engine wear. Since instantaneous fuel consumption displays are already often found in motor vehicles nowadays, total consumption can be determined simply by adding the instantaneous consumption values. Thus, it is only necessary merely to add a memory to create a circuit for the display according to the invention.

However, in order for the display function to conform to existing regulations, another parameter, for example the total distance travelled, must also be monitored. In some countries, a signal to indicate the need for servicing must be displayed after a predetermined distance has been travelled. Moreover, the additional parameter may improve the above arrangement. The instantaneous fuel consumption can be estimated when the additional parameter reaches an extreme value. Such parameters include, for example, engine oil and coolant temperature or engine rpm.

Within the scope of the invention, an additional advantageous measure can consist of dividing a predetermined maximum total fuel consumption into equal intervals, and assigning a pilot light to each of these intervals, said lights being extinguished at the end of the corresponding interval. By dividing into intervals in this fashion, an especially stressful driving style can be identified even before the maximum total consumption value is reached, since the pilot lights for the corresponding intervals will be extinguished more notably.

Often, it will suffice merely to turn on the pilot lights before starting the engine and turn them off when the engine starts, or afterward. Thus, each time he starts the vehicle, the driver is provided with information on approximately how long it will be until servicing is required. He can adjust his driving style to postpone this time as long as possible. In addition, he is not disturbed by the pilot lights as he drives.

In addition to the pilot lights, warning lights for the same total consumption intervals can be switched on continuously when the maximum total fuel consumption value is exceeded. The driver then receives information regarding the necessity of maintenance with increasing urgency.

This urgency can be intensified by making each of the consumption intervals employed after exceeding the maximum total fuel consumption smaller than the intervals comprising the maximum total level consumption. In this case more warning lights appear at shorter intervals, and stay on to provide a constant reminder to service the vehicle. For example, the intervals employed after maximum total fuel consumption have been reached may be one-half the size of the intervals used before maximum total fuel consumption is reached.

In order to ensure that vehicles which are not driven often will also have their service intervals indicated, a fixed time can also be combined with the maximum total fuel consumption, after which time a signal will likewise appear. In these cases, service becomes necessary as a result of aging phenomena, affecting, for example, the operating fluids used; these are phenomena which are not taken into account in vehicles which undergo average service.

Alternatively, a warning signal can appear independently of the total fuel consumption signal when the fixed time has elapsed. This signal can be used, for example, to indicate that additional maintenance is required such as touching up the undercoating.

OBJECTS OF THE INVENTION

It is therefore an object of the invention to provide a service-interval display for motor vehicles which produces a signal when a limiting parameter value is reached.

It is a further object of the invention to provide a service-interval display wherein a limiting parameter employed is total fuel consumption.

It is still another object of the invention to provide a service-interval display wherein a plurality of parameters are employed in determining when a signal is indicated by the display.

It is a further object of the invention to provide a service-interval display wherein a predetermined maximum total fuel consumption is divided into equal intervals for which respective pilot lights are lit during the consumption interval and extinguished at the end of the corresponding interval.

It is a further object of the invention to provide a service-interval display wherein equal intervals of a predetermined maximum total fuel consumption are represented by pilot lights which are lit when the engine starts but extinguished shortly thereafter.

It is a further object of the invention to provide a service-interval display wherein warning lights indicate that maximum total fuel consumption has been exceeded, the consumption exceeding the maximum total fuel consumption being divided into consumption intervals.

It is a further object of the invention to provide a service-interval display wherein total fuel consumption is employed as a parameter and, in addition, a warning signal is provided when a fixed time has expired independently of the signal for total fuel consumption.

It is a further object of the invention to provide a service-interval display wherein warning lights indicate consumption intervals beyond a maximum total fuel consumption wherein the maximum total fuel consumption is divided into equal intervals and the fuel consumption beyond maximum total fuel consumption is divided into intervals, the latter intervals being less than the intervals forming the maximum total fuel consumption.

A further object of the invention is to provide a method for service-interval display for motor vehicles employing total fuel consumption and other parameters to determine when a signal is produced representing that a limiting parameter value is reached.

These and other objects, features and advantages of the present invention will become more apparent from the following description when taken in connection with the accompanying drawings which show, for the purposes of illustration only, one embodiment of the invention.

DESCRIPTION OF THE PREFERRED EMBODIMENT

Figure 1:
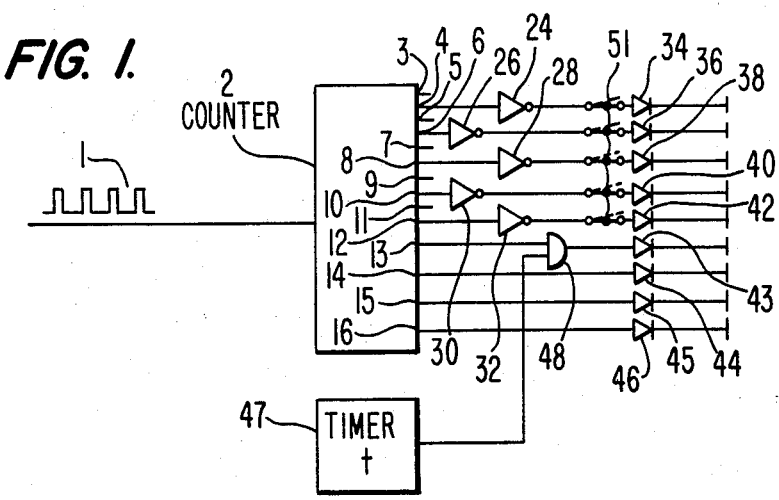
FIG. 1 shows an embodiment of the invention wherein fuel consumption pulses are fed directly to a memory.

FIG. 1 shows a circuit for a service-interval display, wherein the total fuel consumption serves as a service criterion.

The circuit receives pulses 1 corrresponding to the fuel consumed, the pulses being generated for example by means of a fuel flowmeter or a transducer to indicate the throttle position of a fuel injector connected in series with an analog/digital converter. The consumption pulses 1 are fed to a memory element such as a counter 2 designed as a shift register, the outputs 3 through 6 of said memory being activated at intervals of 100 liters of total consumption. For example each fuel consumption pulse 1 may represent consumption of 1 liter of fuel. An input of 100 pulses would produce an output signal on output line 3.

Counter 2 may comprise a number of forms known to those skilled in the art. While described as a shift register, it may also be constituted by a serial counter chain, the appropriate stages of which issue outputs on lines 3 through 12 representing increasing fuel consumption, as consumed in 100-liter increments.

LEDs 34, 36, 38, 40 and 42, for indicating incremental amounts of fuels consumption, are connected to outputs, 4, 6, 8, 10 and 12 through inverters 24, 26, 28, 30 and 32, said LEDs being extinguished sequentially as incremental amounts of 200 liters of fuel are consumed. LED 34 indicates a first increment while LED 36–42 indicate successive increments. Thus, LED 42 when lit indicates that a maximum of 1000 liters of fuel has been consumed. Depending on the driving style and other operating conditions, the LEDs, which are green for example, relative to a driving style involving extreme engine stress, remain lit for periods of time which are directly proportional to the gentleness with which the engine is operated. This function of the display is therefore largely independent of the distance travelled.

The additional outputs 13 to 16 of counter 2 are connected directly to LEDs 43 to 46, which are yellow or red for example. LED 43 for indicating elapsed engine running time is also controlled by a timer 47 and a connected OR element 48 which triggers an output signal after an operating time of 11 months for example following the last maintenance operation.

Figure 2:
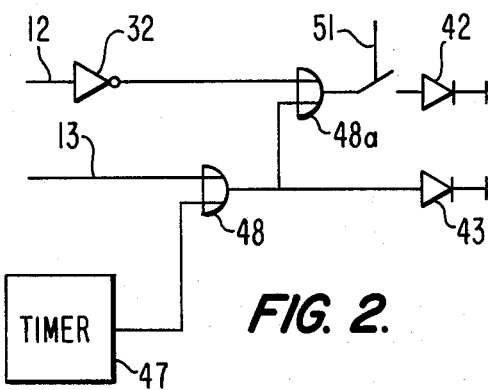
FIG. 2 shows a feature of the invention wherein an LED remains on after maximum fuel volume has been consumed.

In another form of the invention as depicted in FIG. 2, the 1000-liter fuel consumption LED 42 which could be turned on before the maximum fuel volume of 1,000 liters has been consumed, via OR gates 48 and 48a after the fixed time stored in timer 47 has elapsed, indicating that service is required.

In yet another form of the invention, the other LEDs 44 to 46 could be arranged to intensify the urgency of the maintenance to be performed; by coming on at 1,000, 1,200, and 1,300 liters, respectively.

Figure 3:
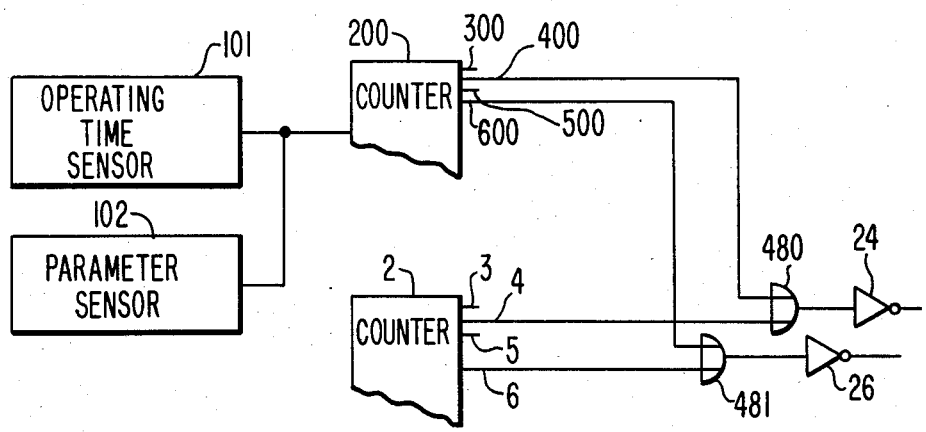
FIG. 3 shows a feature of the invention wherein engine parameters are monitored to control the indication.

In addition to merely monitoring fuel consumption, as shown in FIG. 3, other parameters, operating time for example, can be monitored by sensors 101 and 102. Another counter 200 corresponding to counter 2 is provided for these parameters, for example, the additional counter adding up the operating hours and delivering output signals at preset intervals. These output signals can be combined with the output signals from outputs 4, 6, 8, 10 and 12 of counter 2 via OR elements such as 480 and 481, and thus be used as well for controlling LEDs 34, 36, 38, 40 and 42.

Figure 4:
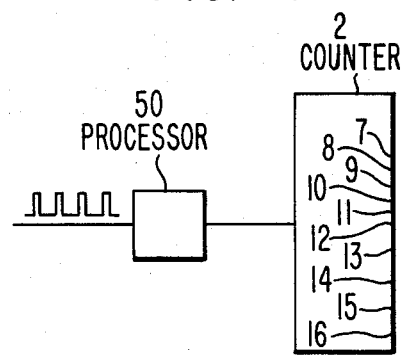
FIG. 4 shows a feature of the invention wherein a processor is employed in conjunction with the system of FIG. 1.

It is also possible to monitor extreme loads on the engine as well. For this purpose, a processor 50, as shown in FIG. 4, can be connected ahead of the memory 2, for receiving the consumption pulses. The processor is connected except when these extreme loads, for example, an extremely high or low coolant temperature, prevail and when connected, reduces the number of pulses fed to memory 2. On the other hand, if the engine operates at normal coolant temperature, the consumption pulses are fed into the memory with their numbers unchanged, causing the memory to fill up rapidly.

The processor 50 may comprise any one of a number of forms known to those skilled in the art for the purposes of performing the function described above. Thus, it may comprise a central processing unit with the usual input/output facilities, arithmetic unit and memory. It may accept engine coolant temperature data sensed from the engine. It is conventional, of course, to sense temperature in analog form and, by means well known in the art, convert it from analog to digital form, in which form the engine coolant temperature data may be stored in memory. The processor may also accept for storage a value for normal coolant temperature input for example, from a keyboard, which admits of changing this value as desired from time to time. Alternatively, the normal coolant temperature data may be stored during fabrication of the processor, in a read-only memory (ROM) which for conventional purposes may be considered as a fixed value for such data.

The central processing unit of the processor may compare the two values, namely, sensed engine coolant temperature data and normal coolant temperature data to determine whether the sensed data is higher, lower, or equal to the normal coolant temperature data. It will be understood by those skill in the art that such comparison is effected by a subtraction of one of the values from the other.

If such a comparison shows equality of the two values, or approximate equality within some established tolerance, the processor reduces the number of pulses fed to memory 2. This can be effected by causing the fuel consumption pulses to be counted in an additional counter, additional to the device 2, so that the output of the additional counter, occurring less frequently than the input fuel consumption pulses, is fed to the memory 2.

If the comparison step indicates any equality of the engine coolant temperature data with respect to the normal coolant temperature data, this will indicate that the engine is undergoing additional difficulties for which an indication for servicing should occur more frequently than under normal conditions. Accordingly, such an indication from the comparison step is used by the processor to transmit the fuel consumption pulses directly to the device 2, without being counted in the additional counter previously described, thus causing the processing of data in device 2 to occur more rapidly, resulting in an earlier warning indication.

While the invention has been described in terms of generating an earlier warning, it will be appreciated that a parameter may serve to justify lengthening the period of warning so that the warning occurs at a later point in time than for normal operation. In such a case, the central processing unit may introduce additional counting steps to further reduce the input to device 2.

Thus, depending upon the parameters sensed the processor may vary the input to device 2 to cause an early, normal or late warning indication as the circumstances may require.

In order to prevent the driver from being unnecessarily disturbed by the display, at least LEDs 34 to 42 can be connected in series with an oil-pressure switch 51 or the like. Thus, when ignition is first effected, LEDs 34 to 42 are lit but after the engine starts and oil pressure rises, switch 51 will break thereby extinguishing LEDs 34 to 42. As long as the corresponding total consumption intervals are not exceeded, the LEDs remain lit only until the operating criterion of the engine, here disclosed as the engine oil pressure, is met.

The invention has been disclosed as applying to motor vehicles. It will be apparent that the system may be applied to other engines or motors wherein a service-interval determination is useful.

While I have shown and described only one embodiment in accordance with the present invention, it is understood that the same is not limited thereto but is susceptible to numerous changes and modifications as known to one having ordinary skill in the art, and I therefore do not wish to be limited to the details shown and described herein, but intend to cover all such modifications as are encompassed by the scope of the appended claims.

For example, while the distance and time intervals such as $i_d$ and $i_t$ and the like have been disclosed as of equal magnitude, special circumstances may require variable and unequal intervals. By the same token, warning intervals need not be one half the magnitude of $i_d$ and $i_t$ but may assume some other relationship thereto.

We claim:

1. A service-interval display for an engine comprising means for generating a first set of signals in response to fuel consumption, accumulating means for accumulating a value representing fuel consumed in response to receipt of said first set of signals, indicating means responsive to said accumulating means for generating a second set of signals to indicate when said accumulated value exceeds a predetermined value representing maximum total fuel consumption thereby to indicate a service interval for said engine which is dependent on engine load, and means for modifying the time of occurrence of said second set of signals in accordance with the value of at least one additional parameter.

2. The service-interval display in accordance with claim 1 wherein said indicating means comprises means for discretely indicating that respective increments of maximum total fuel consumption have been reached during engine use, whereupon a service interval is indicated when each of said increments is indicated.

3. The service-interval display in accordance with claim 2 wherein said means for discretely indicating further comprises a pilot light associated with respective defined first increments of maximum total fuel consumption, and said indicating means further comprises extinguishing means for extinguishing of each pilot light upon the completion of the corresponding increment of maximum total fuel consumption.

4. The service-interval display in accordance with claim 3 comprising means for extinguishing the pilot lights at the time the engine starts.

5. The service-interval display in accordance with claim 2 further comprising means for maintaining a warning signal display after maximum total fuel consumption is reached for at least one second defined increment of fuel consumption.

6. The service-interval display in accordance with claim 4 further comprising means for maintaining a warning signal display after maximum total fuel consumption is reached for at least one second defined increment of fuel consumption.

7. The service-interval display in accordance with claim 5 wherein said means for maintaining a warning signal display after maximum total fuel consumption is reached comprises
   means for displaying each second defined increment, each second defined increment being less than said increments of maximum total fuel consumption.

8. The service-interval display in accordance with claim 6 wherein said means for maintaining a warning signal display after maximum total fuel consumption is reached comprises
   means for displaying each second defined increment, each second defined increment being less than said increments of maximum total fuel consumption.

9. The service-interval display in accordance with claim 1 further comprising
   means for effecting the generation of said second signals in response to completion of a fixed time period.

10. A method for displaying a service-interval for an engine comprising the steps of
   monitoring at least one parameter including fuel consumption,
   establishing a value for maximum total fuel consumption, the value comprising a plurality of discrete increments which are successively completed upon operation of said engine,
   providing an indication as each discrete increment is completed,
   modifying the time of occurrence of said indication in accordance with the value of at least one additional parameter, and
   indicating, at a modified time, a service interval for said engine, which is thereby dependent on engine load, upon completion of a predetermined number of increments.

11. The method for a service-interval display as set forth in claim 10 wherein said indication comprises respective light indications, said method further comprising
   extinguishing said light indications of said discrete increments after starting the engine.

12. The method for a service-interval display as set forth in claim 11 further comprising
   indicating continuously a warning signal after maximum fuel consumption is reached.

13. The method for service-interval display as set forth in claim 12 further comprising
   measuring the passage of a fixed time period from a fixed point in time, and
   indicating said warning signal in response to completion of said fixed time period independently of total fuel consumption.

14. A method for determining and indicating the service interval of a motor vehicle driven by an internal combustion engine, comprising the steps of:
   determining an expected amount of fuel used by the motor vehicle over a given travel distance based on the average fuel consumption of the respective motor vehicle;
   totalizing the actually consumed amount of fuel between each service interval; and
   triggering an alarm, at a time dependent upon at least an additional parameter other than fuel, when the actually consumed amount of fuel reaches the expected amount.

* * * * *